(12) United States Patent
Larsen (10) Patent No.: US 8,042,158 B2
(45) Date of Patent: Oct. 18, 2011

(54) MANAGEMENT OF USER AUTHORIZATIONS

(75) Inventor: Rune Hartelius Larsen, Allerod (DK)

(73) Assignee: International Business Machines Corporation, Armonk, NY (US)

( * ) Notice: Subject to any disclaimer, the term of this patent is extended or adjusted under 35 U.S.C. 154(b) by 769 days.

(21) Appl. No.: 12/062,901

(22) Filed: Apr. 4, 2008

(65) Prior Publication Data

US 2008/0276296 A1    Nov. 6, 2008

(30) Foreign Application Priority Data

May 4, 2007    (EP) .................................... 07107535

(51) Int. Cl.
*H04L 29/06* (2006.01)
(52) U.S. Cl. .................... 726/4; 726/1; 726/28; 705/51; 713/185
(58) Field of Classification Search .................. 726/1, 4, 726/28; 705/51; 713/185
See application file for complete search history.

(56) References Cited

U.S. PATENT DOCUMENTS

| | | | |
|---|---|---|---|
| 6,237,036 | B1 | 5/2001 | Ueno et al. |
| 6,871,232 | B2 | 3/2005 | Curie et al. |
| 2003/0088786 | A1 | 5/2003 | Moran et al. |
| 2003/0135755 | A1* | 7/2003 | Hahn ............................ 713/201 |
| 2003/0187846 | A1* | 10/2003 | Bangel et al. ..................... 707/9 |
| 2005/0138420 | A1 | 6/2005 | Sampathkumar et al. |
| 2005/0289234 | A1 | 12/2005 | Dai et al. |
| 2006/0089932 | A1 | 4/2006 | Buehler et al. |

FOREIGN PATENT DOCUMENTS

| | | |
|---|---|---|
| EP | 0547990 A1 | 11/1992 |
| EP | 1768048 A2 | 9/2006 |
| GB | 2430283 A | 9/2006 |
| WO | WO 0000896 A1 | 5/1999 |

OTHER PUBLICATIONS

Thomas, Roshan K. (Odyssey Research Associates), "Team-based Access Control (TMAC): A primitive for Applying Role-based Access Controls in Collaborative Environments", Proceedings of the ACM Workshop on Role-Based Access Control, 1997, pp. 13-19.
"Identity and Access Management", Oct. 26, 2004, Avaya Inc. and Earnst & Young LLP http://conference.digitalidworld.com/2004/attendees/slides/1026__1700_F.pdf.
Forster, Jacques (Solution Architect, OPNS), "Role Based Access Control Privilege Management the Pragmatic Way", Open Forum 2006, http:/www.opns.be/pdf/RoleBasedAccessControl.pdf.
Cheng, Edward C., "An Object-Oriented Organizational Model to Support Dynamic Role-based Access Control in Electronic Commerce Applications", Proceedings of the 32nd Hawaii International Conference on System Sciences—1999, http:csd12.computer.org/comp/proceedings/hicss/1999/0001/08/00019022.PDF.
Shin, Dongwan et al., "A Role-Based Infrastructure Management System: Design and Implementation", Concurrency and Computation: Practice and Experience, v 16, n 11, Sep. 2004, Computer Security, pp. 1121-1141.

* cited by examiner

*Primary Examiner* — Eleni Shiferaw
*Assistant Examiner* — Paul Callahan
(74) *Attorney, Agent, or Firm* — Law Offices of Ira D. Blecker, P.C.

(57) ABSTRACT

A method of determining unauthorized user access requests in a data processing system, the method comprising the steps of accessing a record of role managed authorizations and a record of manually assigned authorizations, receiving a record of user authorization requests from a plurality of data processing systems, and comparing the record of user authorization requests to the record of role managed authorizations and to the record of manually assigned authorizations to identify any unauthorized authorizations.

11 Claims, 12 Drawing Sheets

MANAGEMENT OF USER AUTHORIZATIONS

FIELD OF THE INVENTION

The invention relates to a data processing system and to a method of operating a data processing system. The invention provides a flexible model for management of user authorizations with a loosely coupled Identity Manager component.

BACKGROUND OF THE INVENTION

In complex computing and data processing systems, authorization of access to components within a system is of a paramount importance. For example, a database system that maintains employee records for a company will manage authorization of access to the records with a list of users who are authorized to access the stored data. Individual users may have different authorization levels managed by the list, such that some users have access to only part of the data stored by the database system.

Figure 1:
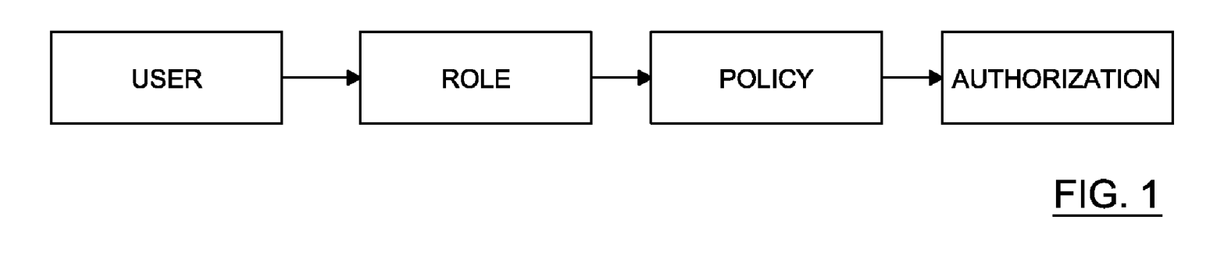
FIG. 1 is a schematic diagram of a user to authorization relationship, based upon roles.

Role-Based Access Control (RBAC) is a very good model for managing users and their authorizations. In the RBAC model, authorizations are granted and revoked based on the specific roles with which a user is associated. The authorization to user assignment is expressed by policies that define the set of authorizations granted by membership to a role. FIG. 1 shows schematically the relationship between User, Role, Policy and Authorization. A user will be associated with one or more roles (based upon the user's assigned responsibilities), and each role has a policy defined that gives one or more authorizations in relation to one or more systems which the user can access.

Figure 2:
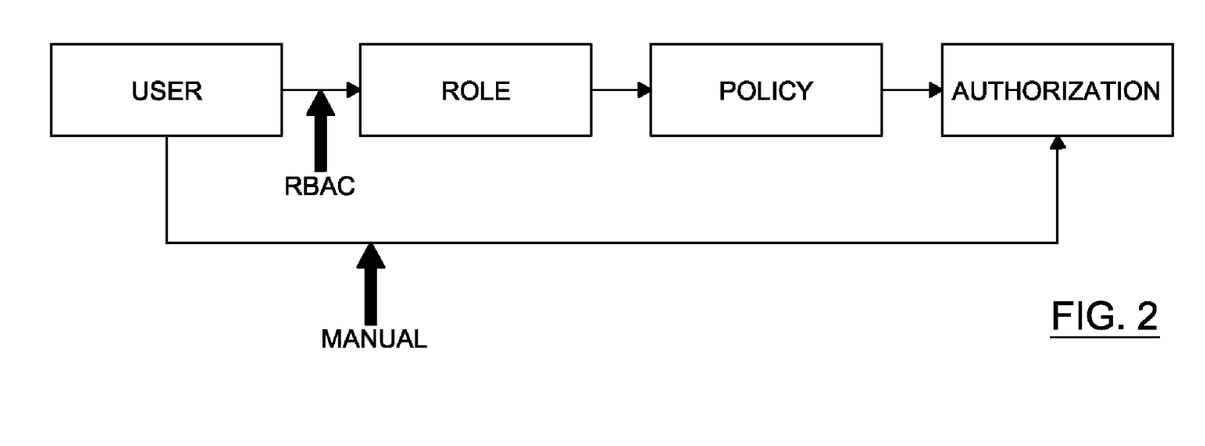
FIG. 2 is a schematic diagram of a user to authorization relationship, based upon roles and manual assignment.

Current systems that provide functionality to support RBAC on multiple platforms (such as IBM Tivoli Identity Manager—ITIM) support two methods of administration: RBAC and manual assignment of individual authorizations. The RBAC model is advantageous because it ties authorizations to the roles the user performs in a business context, using a set of policies. The manual model is advantageous because it is very flexible, and allows fine grained control on a per-user basis. In real world implementations, the data processing system aims to implement a fully RBAC model but often a combination of RBAC and the manual model is required to allow the full set of authorizations to be assigned to users. FIG. 2 shows schematically how authorizations are generated for a user, where RBAC authorizations are granted and revoked based on role membership, and individual authorizations are managed by a human administrator.

When authorizations are applied to a target system (i.e. the end system is informed that user x has an authorization with respect to that system) there is no way to tell how the original assignment to the user was made (it can be assigned either by role, individually or both). This occurs because most systems are not prepared for a management layer and have fixed data models for the authorization data (i.e. they have a single field for groups on the user account). The management systems of today adopt the data model from the targets systems and therefore use a single field for authorization data (typically groups).

Support for individual authorizations can be achieved by creating a role for each authorization but this approach has a major drawback in the number of roles in the system. If the RBAC system manages large systems then the number of roles can easily exceed 20,000, and this makes management difficult. Individual authorizations are managed by a human administrator.

SUMMARY OF THE INVENTION

According to a first embodiment of the present invention, there is provided a method of determining unauthorized user access requests in a data processing system, the method comprising the steps of accessing a record of role managed authorizations and a record of manually assigned authorizations, receiving a record of user authorization requests from a plurality of data processing systems, and comparing the record of user authorization requests to the record of role managed authorizations and to the record of manually assigned authorizations to identify any unauthorized authorizations.

According to a second embodiment of the present invention there is provided a data processing apparatus for determining unauthorized user access requests in a data processing system, the apparatus comprising means for accessing a record of role managed authorizations and a record of manually assigned authorizations, means for receiving a record of user authorization requests from a plurality of data processing systems, and means for comparing the record of user authorization requests to the record of role managed authorizations and to the record of manually assigned authorizations to identify any unauthorized authorizations.

According to a third embodiment of the present invention, there is provided a computer program product loadable into the internal memory of a digital computer, comprising computer executable instructions, when the product is run on a computer, for performing the steps of accessing a record of role managed authorizations and a record of manually assigned authorizations, receiving a record of user authorization requests from a plurality of data processing systems, and comparing the record of user authorization requests to the record of role managed authorizations and to the record of manually assigned authorizations to identify and unauthorized authorizations.

BRIEF DESCRIPTION OF THE DRAWINGS

Reference will now be made by way of example only to the accompanying drawings, in which.

DETAILED DESCRIPTION

Figure 3:
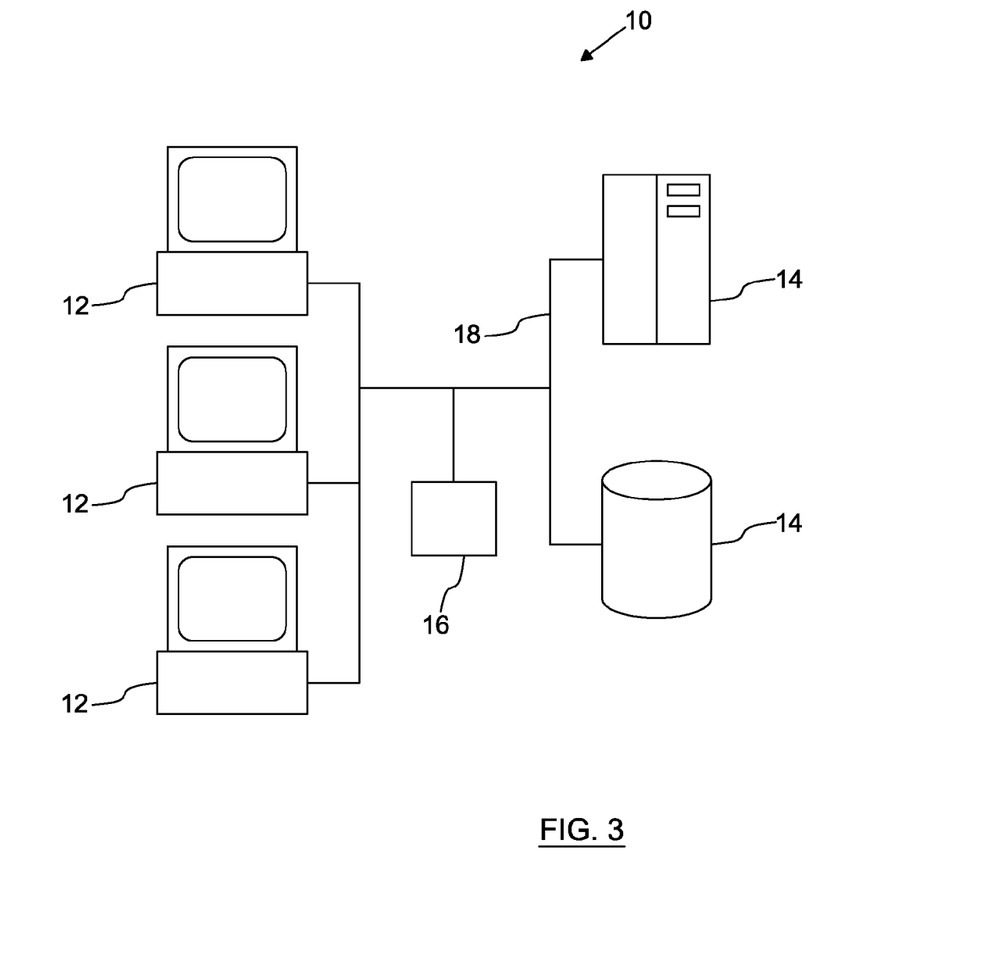
FIG. 3 is a schematic diagram of a data processing system.

A data processing system 10 is shown in FIG. 3, which comprises a plurality of users 12, a plurality of systems 14, each requiring authorization for access, a platform 16 for managing authorization of user access to the systems, and a network 18 interconnecting users 12, systems 14 and platform 16. System 10 shown in FIG. 3 is shown in a very simple form, as in many implementations of such systems, there will be a very large number of users 12 and systems 14, and the network 18 is very likely to be comprised of multiple sub-networks of different types, some of which will be local and private (such as Ethernet Intranets) and some of which will be wide-area and public (such as the Internet). Network 18 could include wireless components.

Users 12 are shown as individual computers, but in fact a user 12 need not be a specific machine, but could be a user account, logged into any machine in the network. In this example, user 12 is a soft component, rather than a piece of hardware. System 10 shown in FIG. 3 could be the internal computing system of a large company with multiple users 12, spread around the World, connected by the network 18 (or more likely multiple sub-networks) to the various end systems 14, which can include components such as servers and databases.

Platform 16 manages authorization of access to systems 14 by users 12. Platform 16 is shown as a separate component from users 12 and systems 14, but could be located anywhere within overall data processing system 10. Platform 16 communicates authorizations to systems 14, which manage access to their data and/or function according to the authorizations stored locally. Each system 14 maintains a list of users 12 that are authorized access, along with the extent of user access, if this is appropriate for the specific system 14. Some systems 14 will have a simple authorization access that either lets user 12 access the entire data/functionality or not, and other systems 14 will have more complicated authorization access that control the level and scope of the user access.

The system supports a management of authorizations that is both flexible and efficient regardless of the number of users and systems in the overall data processing system. The invention includes a data model and algorithm that provides a way of combining RBAC and individual assignment with an intuitive and manageable interface. The invention splits the data field that holds the list of authorizations for a user into multiple records/fields (minimum three) and an interface that governs how the fields are populated and how data is exchanged with the managed systems. The control of the data processing system that manages the authorizations, can be embodied in a computer program product stored on a medium such as CD or other suitable storage device.

As stated above, the data model divides the managed list of authorizations into three or more separate records. A first record is used to store the authorizations that are managed automatically by the RBAC system. A second record is used to store the authorizations that are maintained by human users. More that one record may be used to divide the administration-levels for groups of administrators junior, senior). A third record is used to store any authorizations that are added on the target system (i.e. not using the platform, and therefore not present in any other list).

Communication between the platform and the target systems can work in either a one- or two-way configuration. In both situations, the processing is the same when the platform issues provisioning transactions to change authorizations on the target systems. In the latter case the platform is scanning the target system to gather information on the current authorization account population and compares the real-world configuration to the reference model defined using policies in the platform. The set of authorizations on the target system is the union of authorizations in the records. An authorization can be assigned to zero or more records, except for the unauthorized authorization record, an authorization in the unauthorized authorization record cannot be a member of other records.

Figure 4:
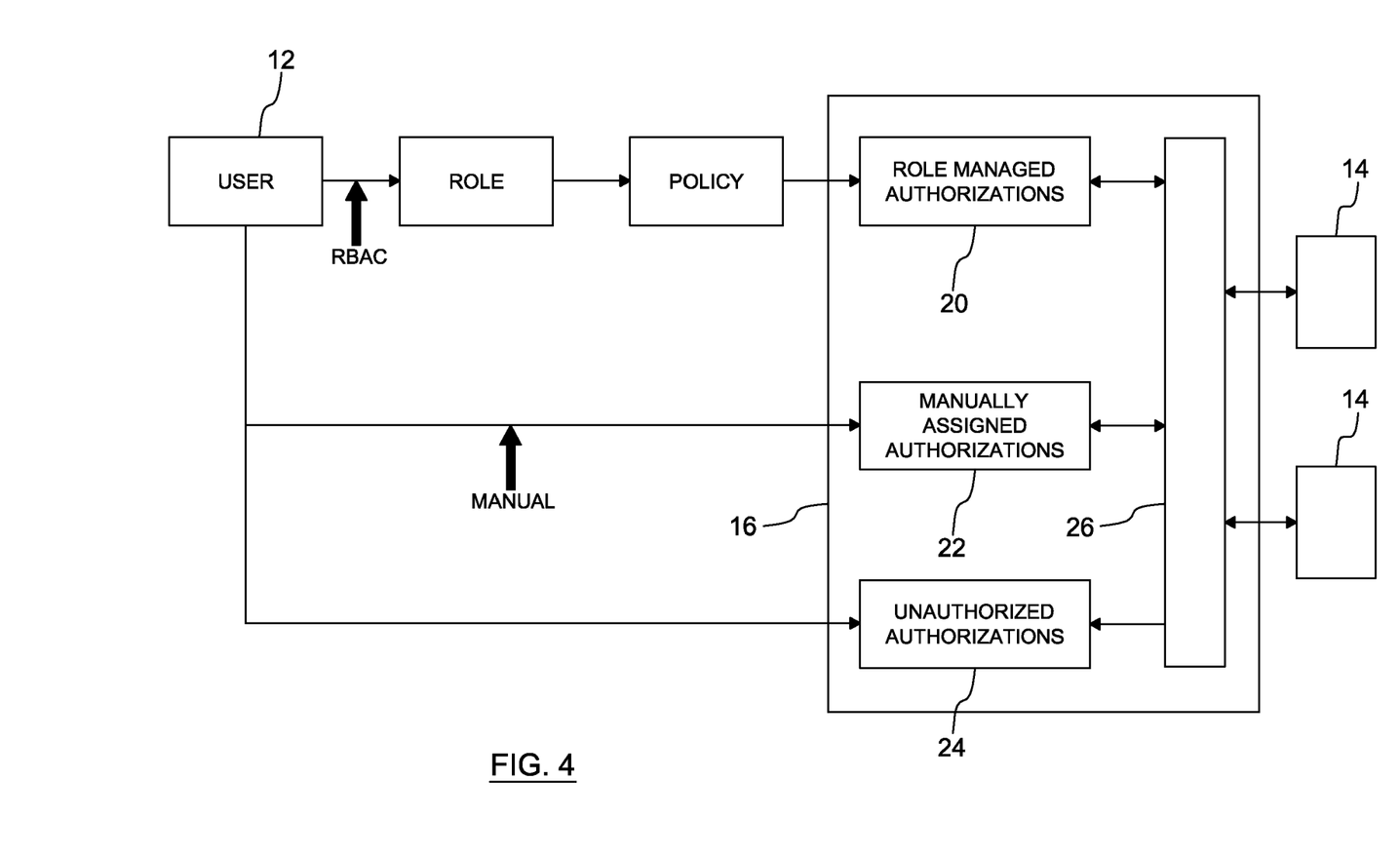
FIG. 4 is a schematic diagram showing more detail of the system of FIG. 3.

FIG. 4 shows more detail of system 10 of FIG. 3, particularly with respect to platform 16. Platform 16 comprises a record of role managed authorizations 20, a record of manually assigned authorizations 22, a record of unauthorized authorizations 24, an interface 26 between records 20 to 24 and plurality of systems 14. Interface 26 arranges to transmit authorizations to systems 14 according to records 20 to 24. Platform 16, in the preferred embodiment, maintains a list of the authorizations in three separate records 20 to 24. A role based authorization is effectively one that applies to a group of users 12 and "role" is used as shorthand for a group of users that are categorized by commonality among them. For example, a role could be a specific division within a business such as human resources, but equally a role could be membership of a sports fraternity within a business.

Additional records can be supported by platform 16. For example, record of manually assigned authorizations 22 may be split into multiple records, according to who made the specific authorization. Each authorization in a record comprises an authorization of user x to access system y, with the optional component of the extent of the user's access to the respective system 14.

Interface 26 can be arranged to execute an algorithm, the algorithm determining the processing of the authorizations. For example, if a new authorization is generated by an administrator, which will then be stored in record 22 of manually assigned authorizations, then interface 26 will execute an algorithm for the handling of this new authorization. Interface 26 will communicate to the appropriate target end system 14 the information contained within the new authorization.

Interface 26 can also arranged to receive from end systems 14 details of authorizations and users stored by systems 14. By comparing these received authorizations with those stored in records 20 and 22, interface 26 identifies authorizations that are neither role managed authorizations nor manually assigned authorizations, stores these authorizations in record 24 of unauthorized authorizations. Any authorization that exists on any of end systems 14 that cannot be accounted for as either role-based or manually generated, is stored in record 24 as an "unauthorized authorization", which supports the identification and management of untraceable and legacy authorizations that exist on systems 14, without an explanation of the existence of such an authorization.

Platform 16 can be arranged to allow the administrator access for the purpose of moving an authorization from record 24 of unauthorized authorizations to record 22 of manually assigned authorizations. In a similar way, platform 16 supports administrator access to allow deletion or amendment of any of the unauthorized authorizations stored in record 24. Interface 26 can be further arranged to periodically poll systems 14 for authorizations, as a method of discovering the existence of the authorizations that would populate record 24.

Figure 5:
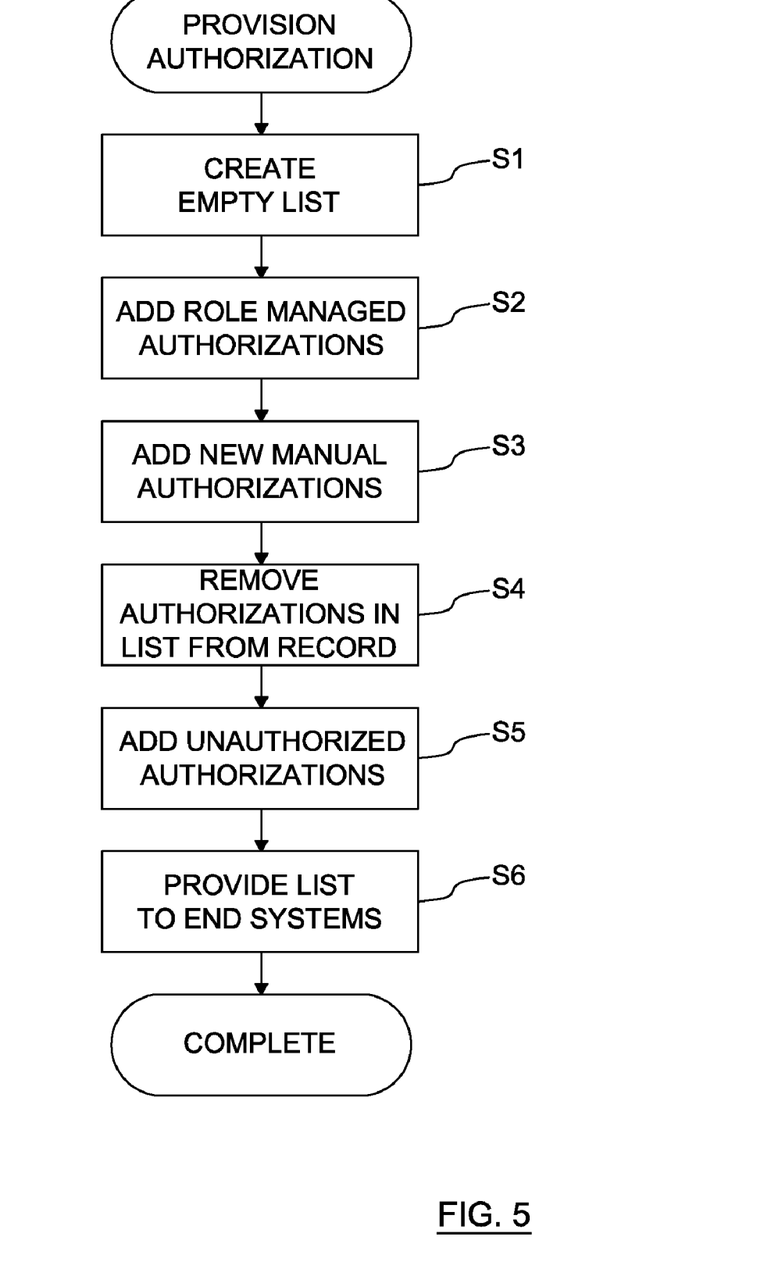
FIG. 5 is a flow diagram of a method of providing authorizations to one or more systems.

FIG. 5 shows how platform 16 can be operated to provide details of the authorizations retained by records 20 to 24 to end systems 14. In this process, at step S1, platform 16 creates an empty list, and at step S2, the authorizations contained in record 20 of role managed authorizations are added to this list. At step S3, any authorizations in record 22 of manually assigned authorizations that are not already in the list are added to the list. At step S4, any authorizations in the list that are present in record 24 of unauthorized authorizations are deleted from the record, as any authorizations in this list at this point will have come from either of records 20 or 22 and therefore cannot correctly be classed as unauthorized authorizations. At step S5, the unauthorized authorizations of record 24 are added to the list, and at step S6, this list is provided by interface 26 to systems 14 that constitute part of the system 10.

From the above, it will be seen that the same authorization of user x to access system y can occur in both record 20 (role based) and record 22 (manually assigned). This is acceptable, and if it occurs, the efficiency of the platform 16 is an advantage because, if user x changes role (for example) and loses the associated authorization stored in record 20, user x will still have access to the system y through the authorization stored in record 22, which will be unaffected by any change to the user's role, or by other changes such as a change to the policy attached to the role of user x.

Figure 6:
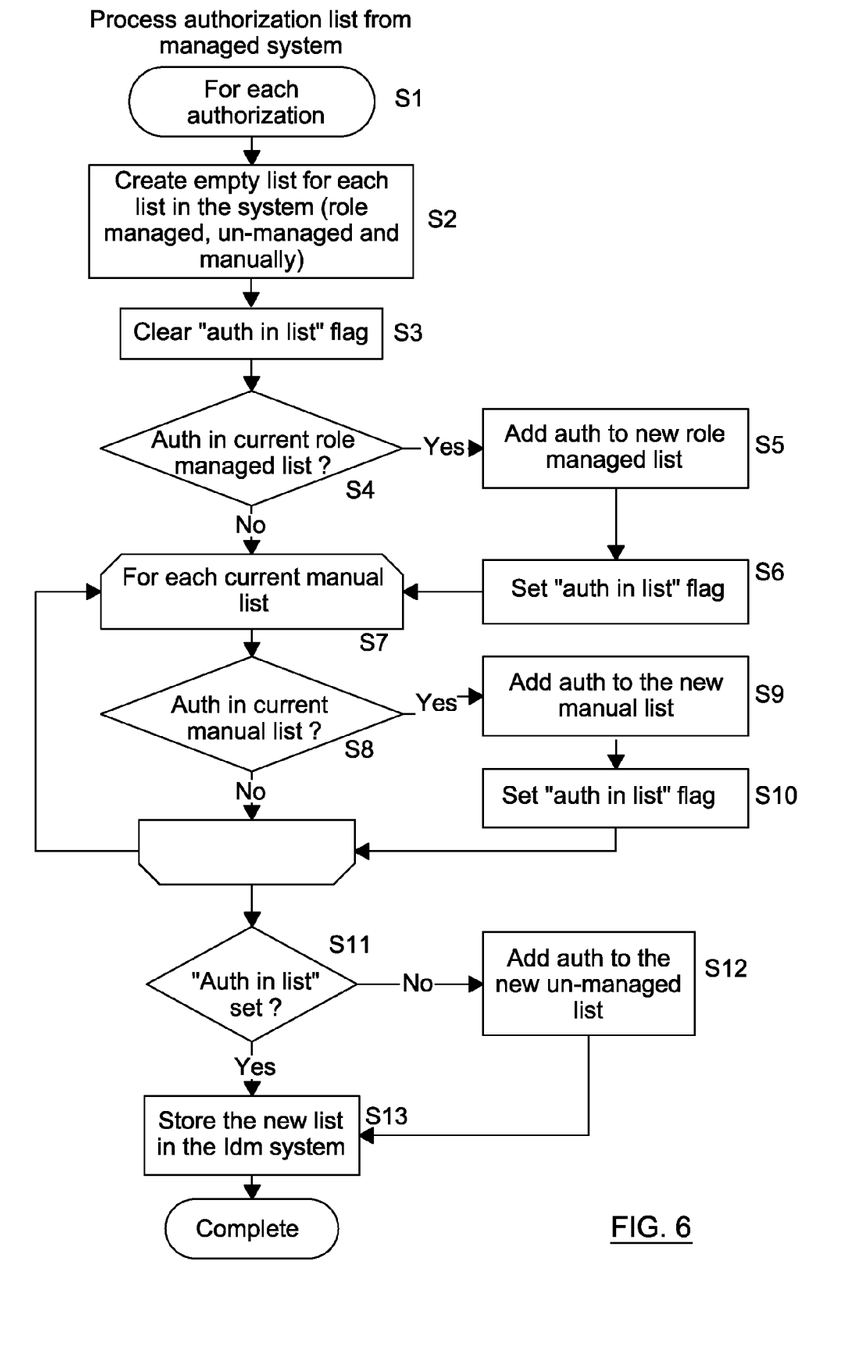
FIG. 6 is a flow diagram of a method of processing received authorizations from an end system.

FIG. 6 shows a flowchart which illustrates how platform 16 can be operated to process user and authorization information polled from target system 14, and operated to update the authorization records 20 through 24. The flow describes the flow executed for each user read from target system 14. Step S1 executes the flow for each authorization on user account 12. Initially in step S2, empty lists equal to the number of records in platform 16 are created, and a computing flag indicating that the authorization is in a managed list is cleared, at step S3.

The algorithm operated by interface 26 checks to see if the in progress authorization is in the current role managed list in management system 16 in step S4. If it is present, then it is added to the new list of role managed authorizations in step S5 and the authorization is marked to be in a managed list, at step S6. Next, each of the manually controlled lists is populated in steps S7 through S10. S7 loops over each manually controlled list. If the authorization is present in the corresponding manually managed list in the management system 16 in step S8, then it is added to the new corresponding list of manually managed authorizations in step S9 and the authorization is marked or set as a flag to be in a managed list in step S10.

At this point, each of the authorizations that are assigned using management platform 16 is placed in the lists. In step S11, the flag is checked to see if the authorization was assigned using management platform 16. If this is not the case then the authorization is added to the unauthorized list, at step S12. Finally, in step S13 the lists built in the workflow are written to the management platform to replace the previous lists.

The data processing system and method of operation include a number of advantages. The RBAC model is utilized with real business related roles and without roles pointing to specific authorizations. This reduces the number of roles dramatically, and makes the system easier to maintain. Secondly, the splitting of the authorization records solves the problem of the removal of authorizations. If the data is not split, then removal of a role-granted authorization becomes impossible because the system cannot determine if removal on the target system is required because the authorization might have been assigned individually. Removal on the target should only happen when the authorization is neither assigned by role nor individually.

Human administrators can be presented with a clear view of how each authorization is granted to a user on a particular target system. In addition, easy reporting and review of individual authorizations and authorizations that are granted on the target platform is possible within the overall system. Separating the individual authorizations into their own record/field makes it very easy to report and supports a process of periodic approval of individual rights.

The storing of "unauthorized authorizations", as rights granted directly on a target system, in a separate record/field on the platform allows automatic deletion or an approval/review process to adopt the authorizations as individual authorizations. An "unauthorized authorization" is an authorization that exists on an end system, but which has not been assigned by either a role-based mechanism or by manual assignment. Such an authorization could be considered a legacy authorization that exists on an end system without a clear explanation of the process that led to the existence of such an authorization.

Figure 7:
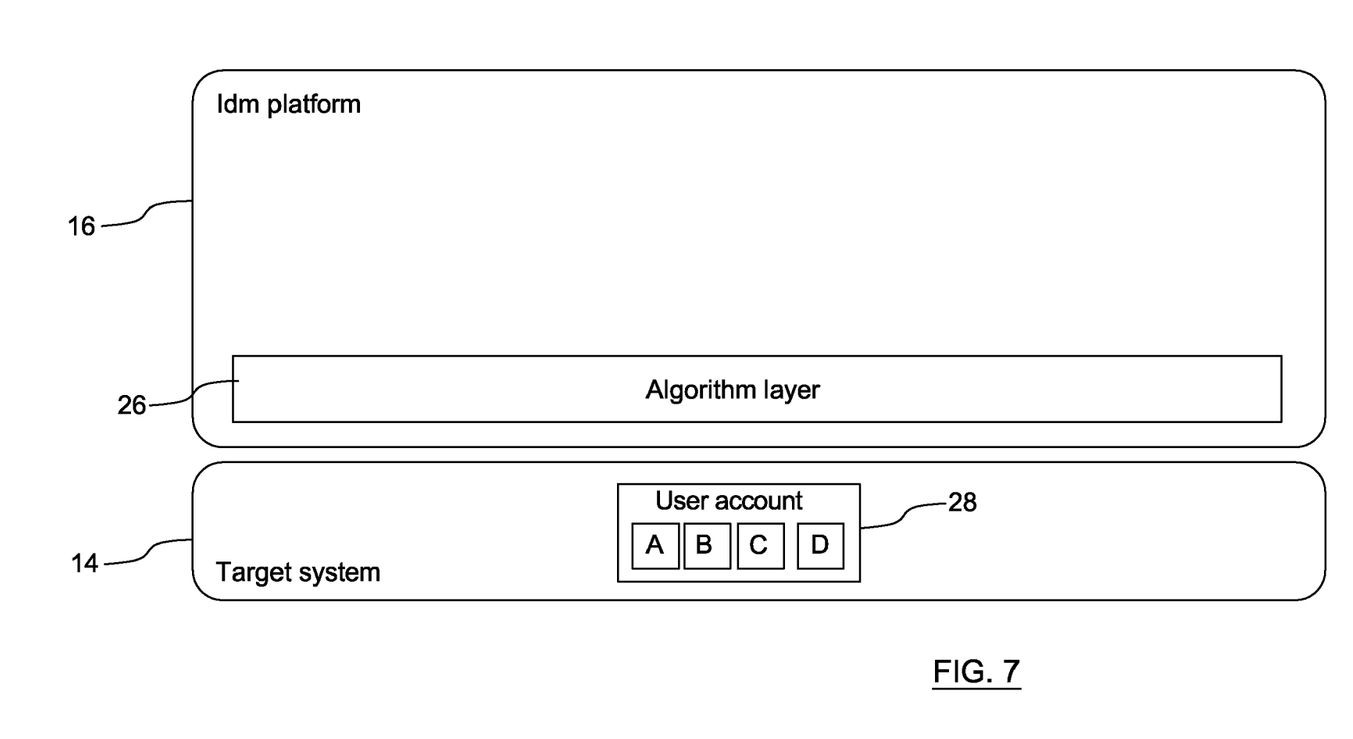
FIGS. 7 to 13 show further schematic diagrams of the data processing system of FIG. 3.
Figure 8:
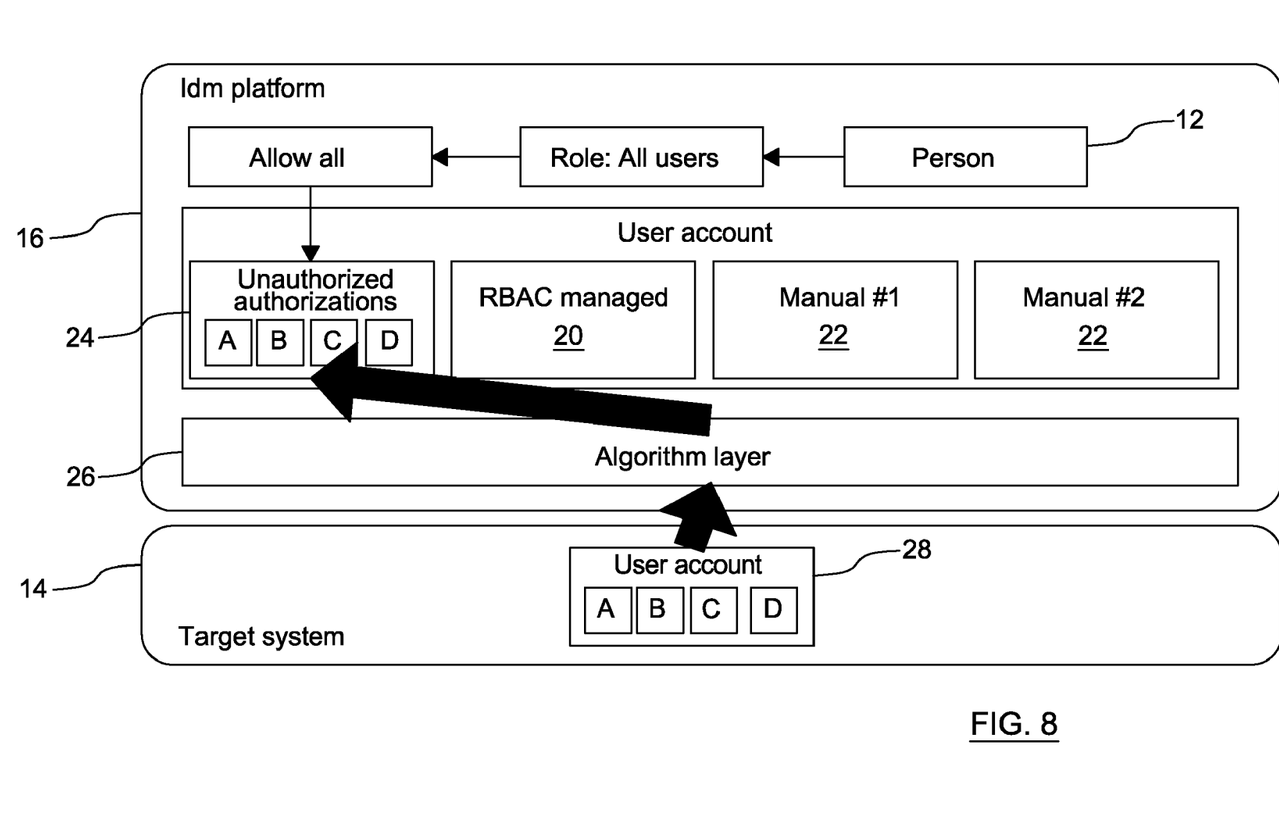

FIGS. 7 to 13 show how system 10 handles the adoption of existing accounts. The procedure uses the terminology from ITIM and the existing reconcile, role and policy functionality, but applies to any Idm platform. The system specifies how to handle the split and merge of the authorization lists. The procedure consists of the steps used to adopt systems, with the additional possible ways of handling user specific authorizations. FIG. 7 shows platform 16 with the interface 26 in communication with target system 14, which has a user account 28 with four authorizations, A, B, C and D. The first stage of the process is shown in FIG. 8, in which the account data is received by platform 16 through interface 26, and used to populate record 24, which stores the so-called unauthorized authorizations. Other records 20 and 22 are at this time empty.

Figure 9:
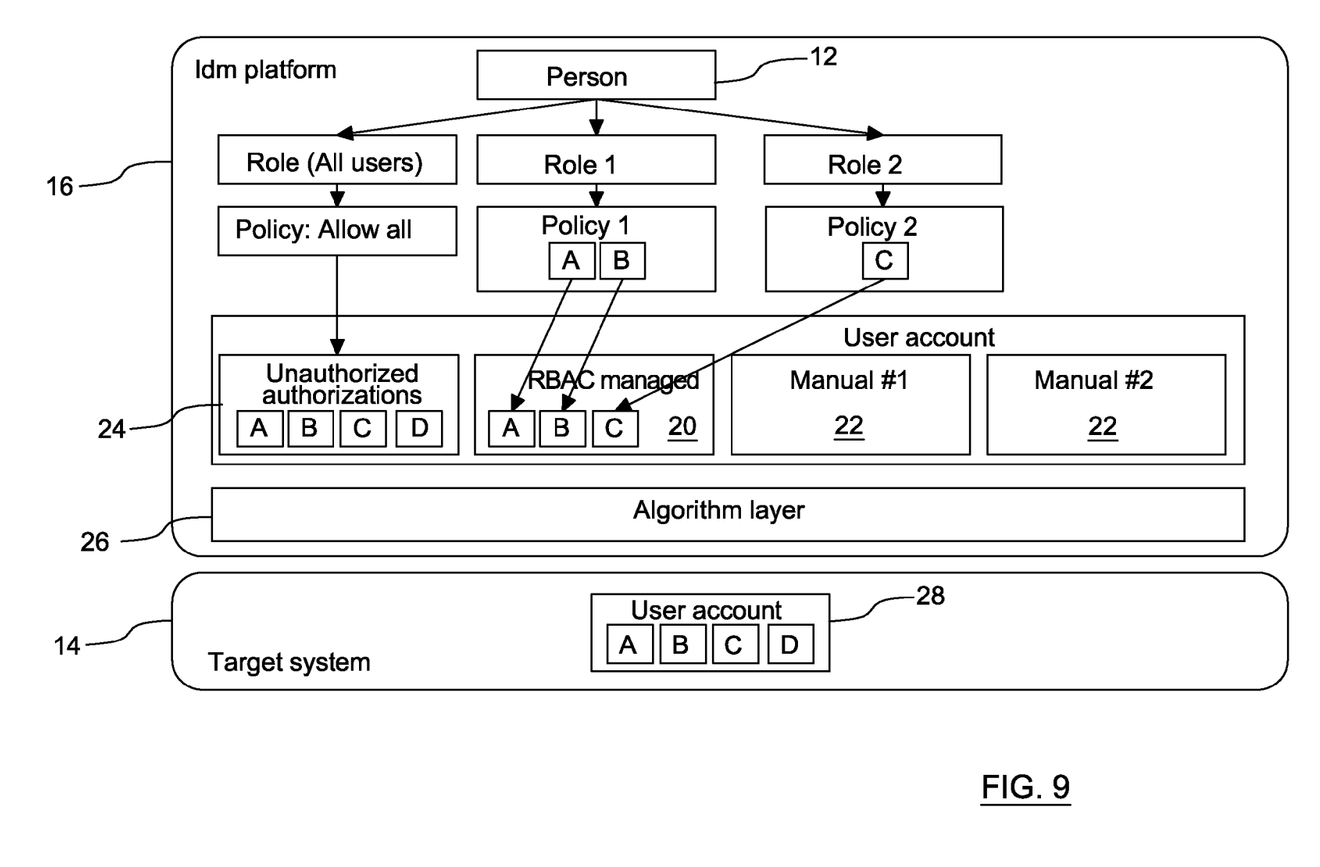
Figure 10:
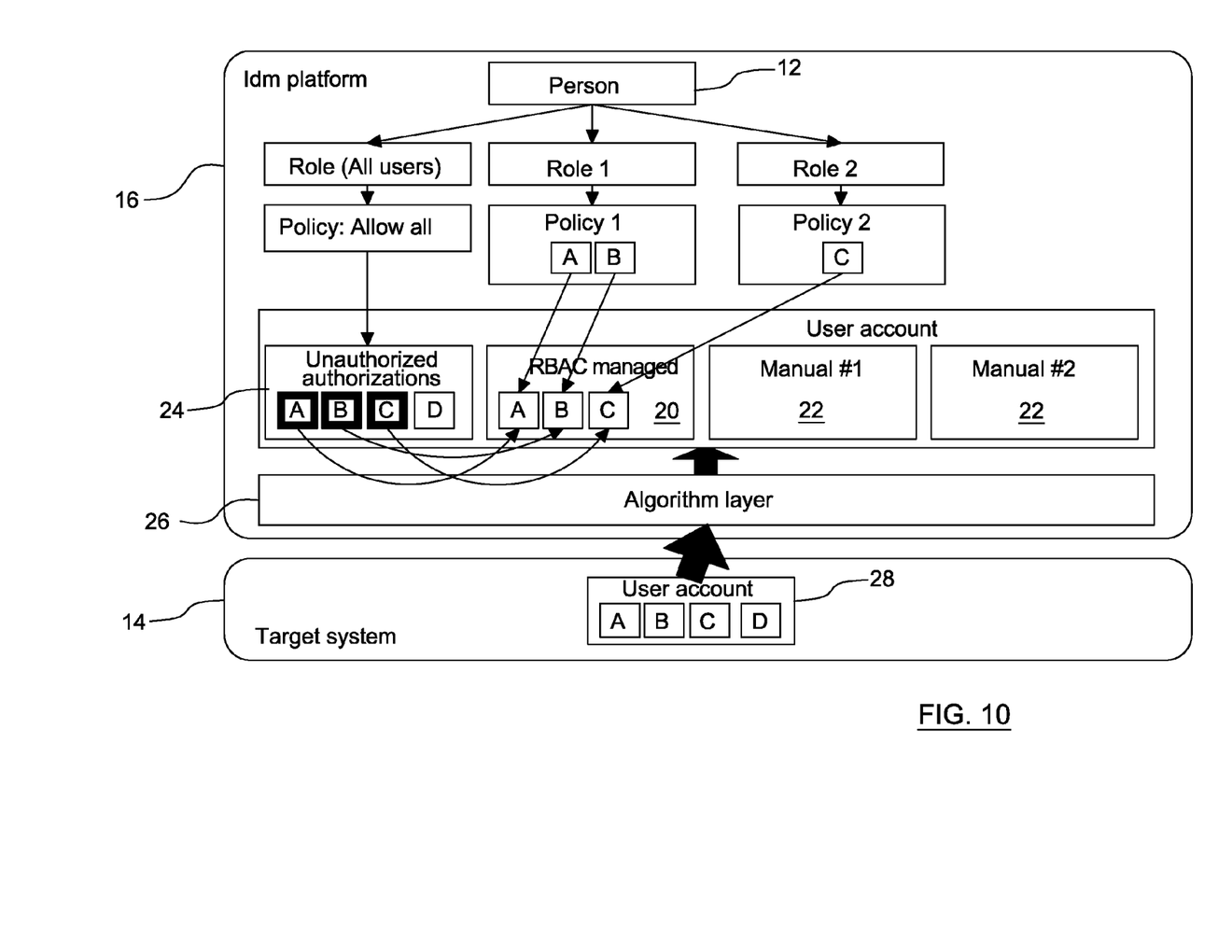

User 12 is then assigned roles and the related policies to these roles are activated to provide authorizations to the relevant record within platform 16. In the example of FIG. 9, user 12 is assigned Roles 1 and 2. Role 1 has authorizations A and B associated with it through the respective policy, and Role 2 has authorization C associated with it. As can be seen in FIG. 9, assigning of the authorizations A, B and C to user 12 results in these authorizations being populated to record 20 (of role based authorizations) stored within platform 16. FIG. 10 shows how the system will adapt during the next reconciliation of authorizations, with the authorizations A, B and C being deleted from record 24 as they are no longer unauthorized authorizations.

Figure 11:
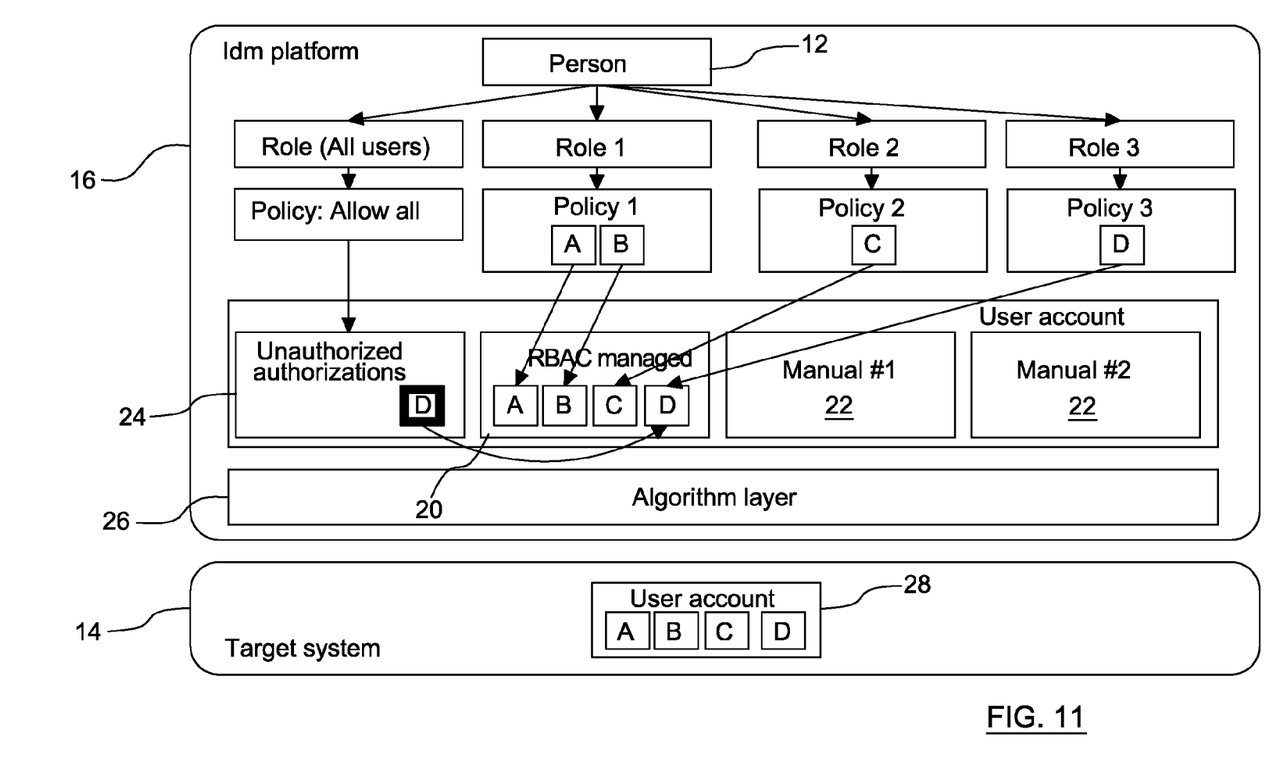
Figure 12:
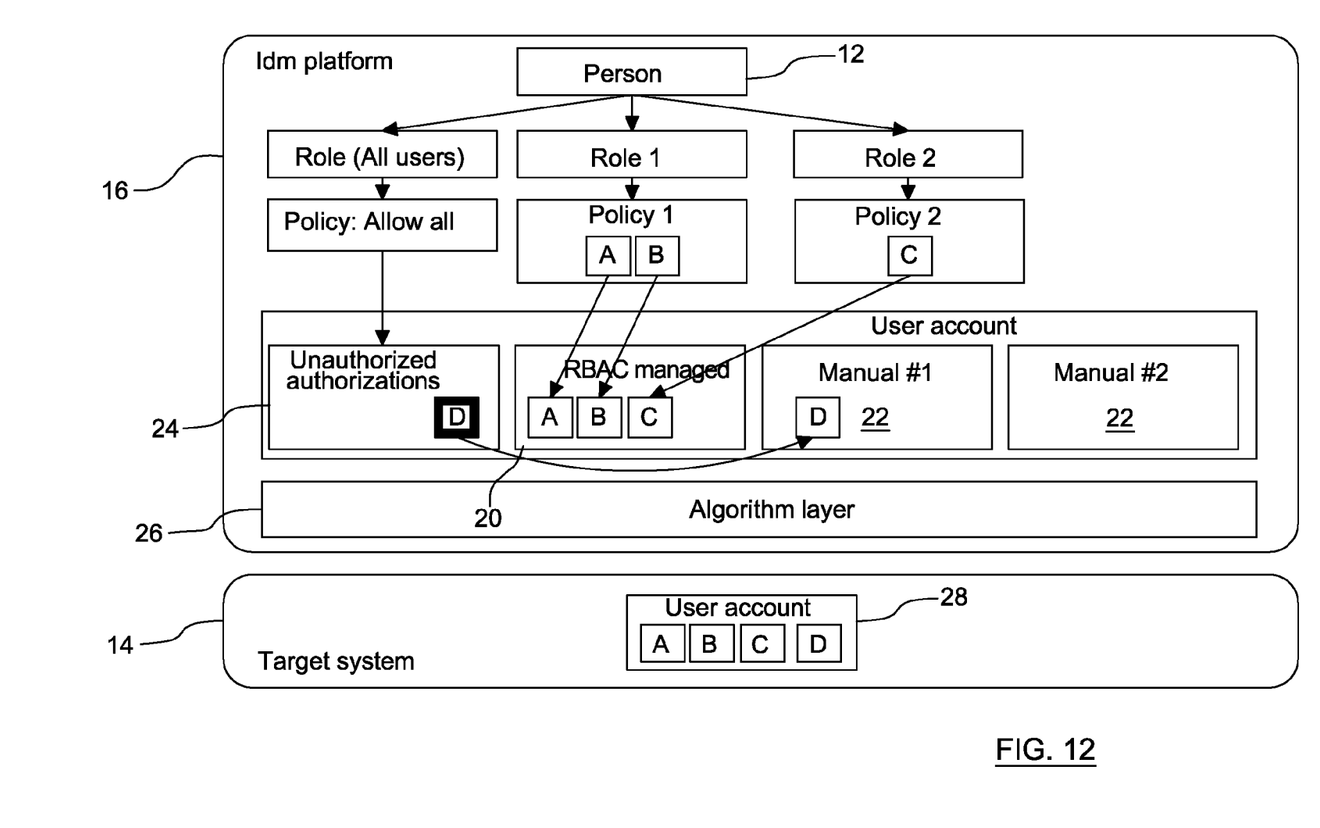
Figure 13:
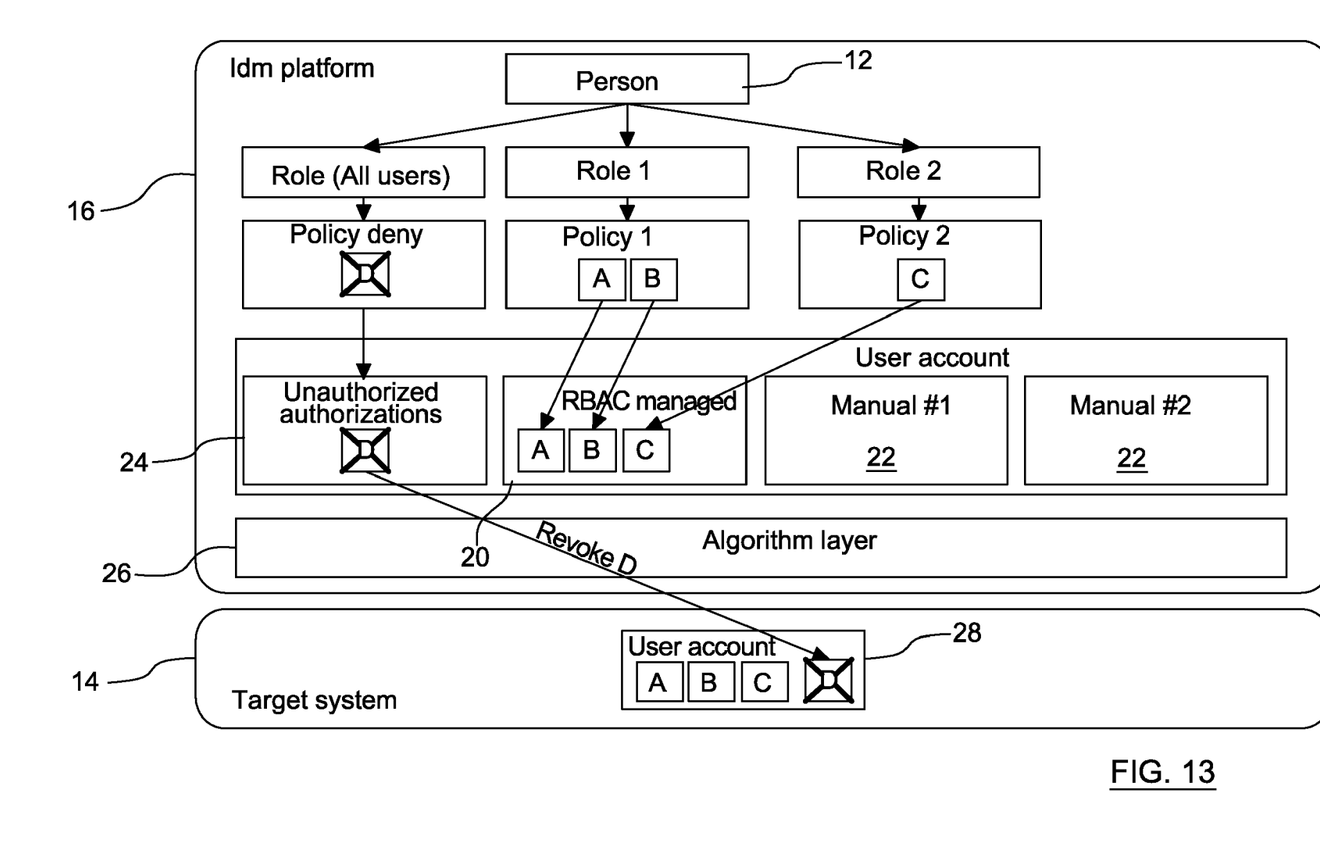

Authorization D that remains in record 24 can be handled in a number of different ways. FIGS. 11 to 13 illustrate alternative possibilities for the processing of the remaining authorization D. In FIG. 11, a new policy is created to match a new Role 3, on the basis that many users need authorization D. This means that authorization D is transferred from record 24 to record 20. If the authorization D is only needed by a few users, then the authorization can be granted manually to those users, and authorization D is effectively transferred from record 24 to record 22, as shown in FIG. 12. Another possibility is shown in FIG. 13, in which the authorization D is revoked and removed by an administrator from record 24, and therefore from corresponding system 14.

What is claimed is:

1. A method of determining unauthorized user access requests in a data processing system, the method comprising the steps of:

accessing a record of role managed authorizations and a record of manually assigned authorizations;

receiving a record of user authorization requests from a plurality of data processing systems;

comparing the record of user authorization requests to the record of role managed authorizations and to the record of manually assigned authorizations to identify any unauthorized authorizations;

operating an interface between the records and the plurality of systems, the operating interface transmitting authorizations to the systems according to the records, receiving specific authorizations from the systems that are neither role managed authorizations nor manually assigned authorizations and storing the specific authorizations in the record of unauthorized authorizations; and responsive to at least one role assigned to a user, moving an authorization from the record of unauthorized authorizations to the record of role managed authorizations or manually assigned authorizations;

wherein the method is carried out by one or more computing systems.

2. The method of claim 1, wherein the operating interface transmitting authorizations to the systems according to the records.

3. The method of claim 1, wherein the step of operating an interface further comprises periodically polling the plurality systems for authorizations.

4. The method of claim 1, further comprising the step of allowing administrator access.

5. A data processing apparatus for determining unauthorized user access requests in a data processing system, the apparatus comprising:
   a hardware computing system platform having:
      a record of role managed authorizations and a record of manually assigned authorizations;
      a record of user authorization requests from a plurality of data processing systems; and
      an interface between the records and a plurality of computing systems requiring authorization for access, the interface comparing the record of user authorization requests to the record of role managed authorizations and to the record of manually assigned authorizations to identify any unauthorized authorizations, the interlace receiving specific authorizations from the computing systems that are neither role managed authorizations nor manually assigned authorizations and storing the specific authorizations in the record of unauthorized authorizations.

6. The apparatus of claim 5, wherein the interface further comprises periodically polling the systems for authorizations.

7. The apparatus of claim 5 wherein the record of role managed authorizations or the record of manually assigned authorizations may be modified by moving an authorization from the record of unauthorized authorizations to the record of role managed authorizations or the record of manually assigned authorizations, respectively.

8. A computer program product embodied in a non-transitory computer-readable medium and loadable into the internal memory of a digital computer, comprising computer executable instructions, when the product is run on a computer, for performing the steps of:
   accessing a record of role managed authorizations and a record of manually assigned authorizations;
   receiving a record of user authorization requests from a plurality of data processing systems;
   comparing the record of user authorization requests to the record of role managed authorizations and to the record of manually assigned authorizations to identify any unauthorized authorizations;
   operating an interface between the records and the plurality of systems, the operating interface transmitting authorizations to the systems according to the records, receiving specific authorizations from the systems that are neither role managed authorizations nor manually assigned authorizations and storing the specific authorizations in the record of unauthorized authorizations; and
   responsive to at least one role assigned to a user, moving an authorization from the record of unauthorized authorizations to the record of role managed authorizations or manually assigned authorizations.

9. The computer program product of claim 8, wherein the operating interface transmitting authorizations to the systems according to the records.

10. The computer program product of claim 8, wherein the step of operating of an interface further comprises periodically polling the plurality of systems for authorizations.

11. The computer program product of claim 10, further comprising the step of allowing administrator access.

\* \* \* \* \*